United States Patent [19]

Alesi

[11] Patent Number: 4,563,804

[45] Date of Patent: Jan. 14, 1986

[54] AIR CONDITIONING COMPRESSOR RETAINING RING REMOVER TOOL

[75] Inventor: Thomas W. Alesi, New Fairfield, Conn.

[73] Assignee: Draf Industries, Inc., Bedford Hills, N.Y.

[21] Appl. No.: 472,409

[22] Filed: Mar. 4, 1983

[51] Int. Cl.[4] .............................................. B23P 19/04

[52] U.S. Cl. ........................................ 29/229; 29/270

[58] Field of Search ................. 29/229, 225, 267, 235, 29/270, 278; 254/131; 81/1 R, 3 R

[56] References Cited

U.S. PATENT DOCUMENTS

| | | | |
|---|---|---|---|
| 2,360,250 | 10/1944 | Mallard | 81/3 R |
| 2,577,193 | 12/1951 | Imse | 29/225 X |
| 4,175,310 | 11/1979 | Boyd | 29/229 |
| 4,223,574 | 9/1980 | Wickett | 81/3 R |

*Primary Examiner*—James G. Smith
*Assistant Examiner*—Steven P. Schad
*Attorney, Agent, or Firm*—Blum, Kaplan, Friedman, Silberman & Beran

[57] ABSTRACT

An air conditioning compressor retaining ring removal and installation tool which when inserted into an installed retaining ring and twisted releases the retaining ring from its housing. The tool has an angled, off-center pin projecting from one end thereof for receipt in the hole in an end of the C-shaped ring.

8 Claims, 10 Drawing Figures

FIG. 1
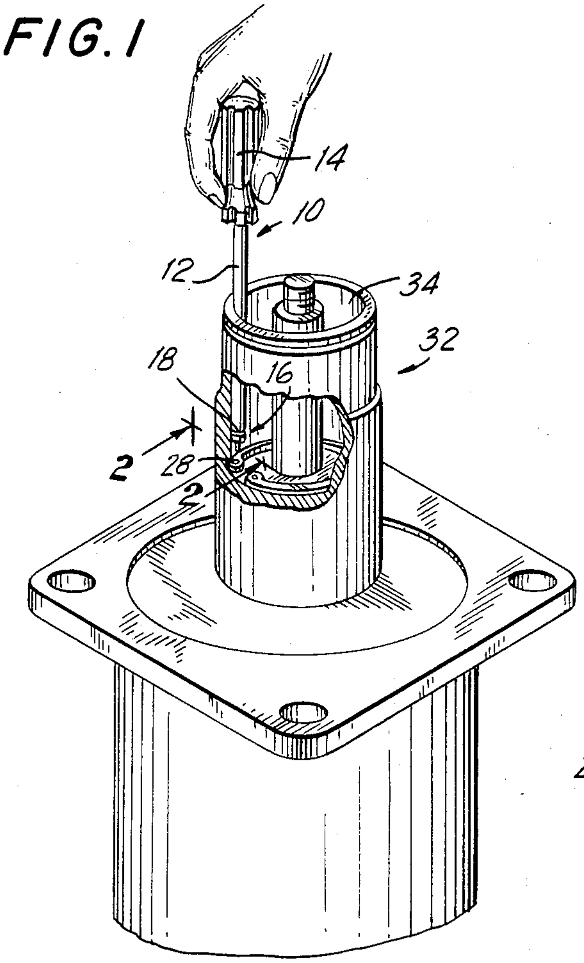
FIG. 2
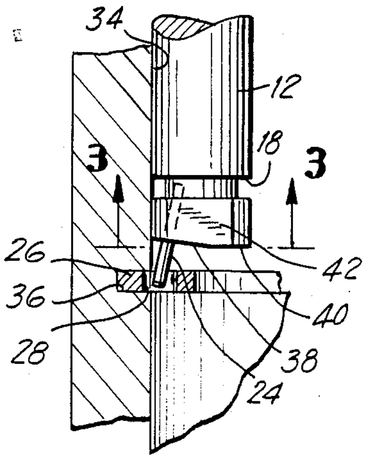
FIG. 3
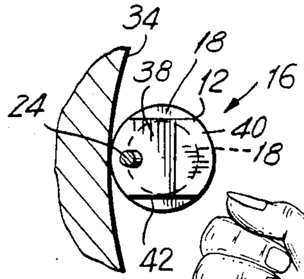
FIG. 4
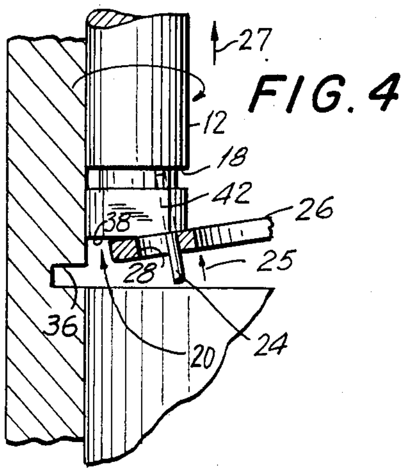
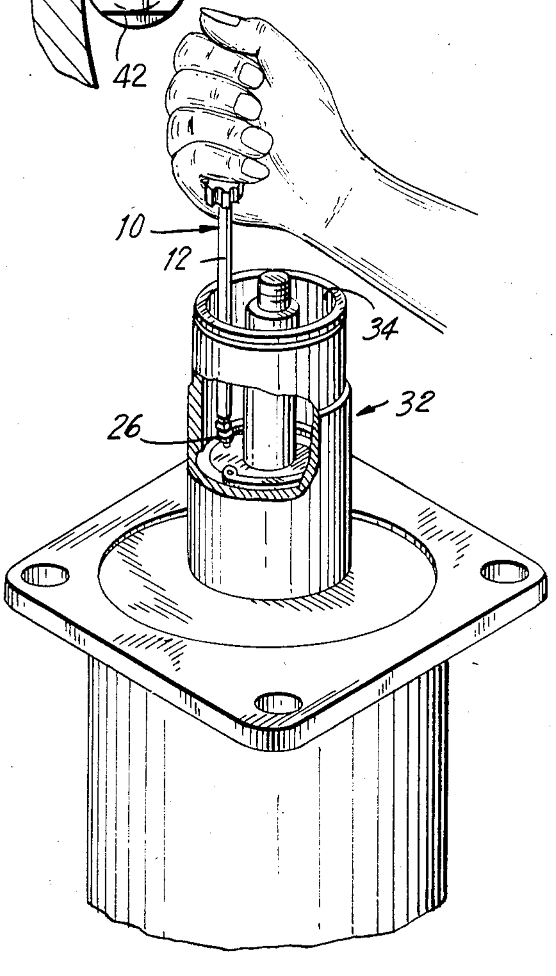
FIG. 5

FIG. 6
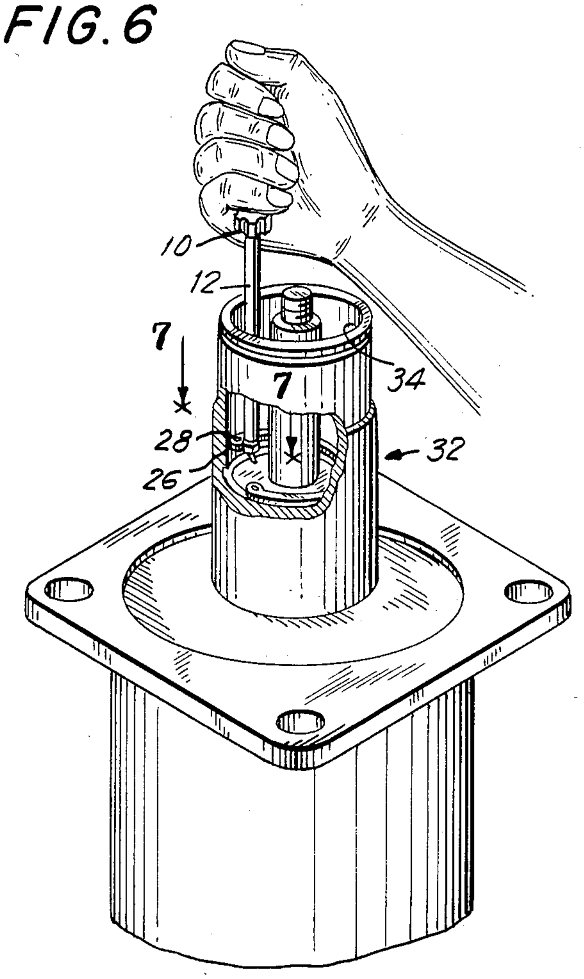
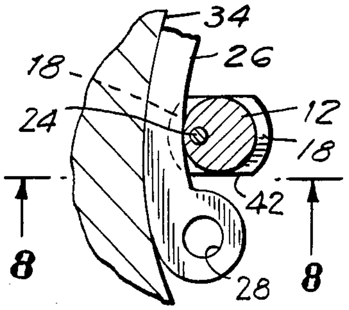
FIG. 7
FIG. 8
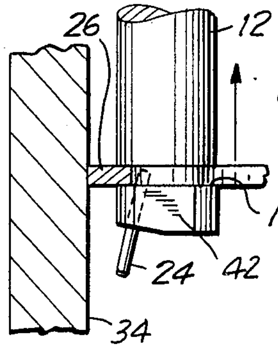
FIG. 10
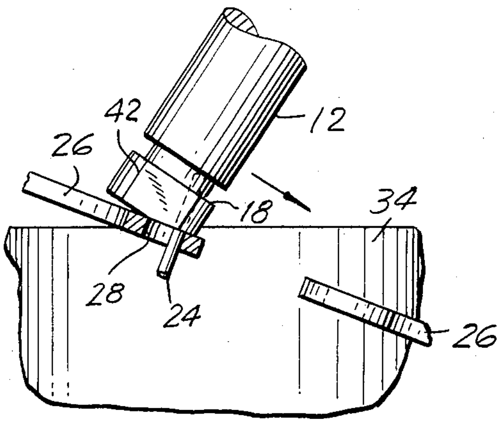
FIG. 9
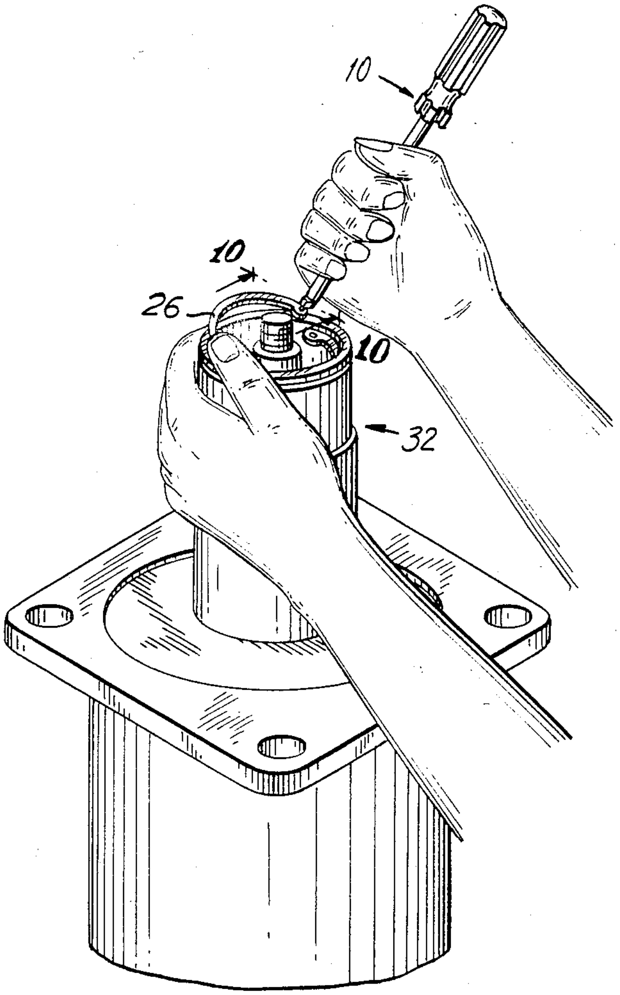

AIR CONDITIONING COMPRESSOR RETAINING RING REMOVER TOOL

BACKGROUND OF THE INVENTION

This application is directed to a device for removing a retaining ring in air conditioning compressors and the like. In many assemblys, resilient C-rings are used to retain components in position. In order to disassemble the components for service or otherwise, it is necessary to manipulate the C-ring. Where the C-ring is positioned so as to be not readily accessible, such manipulation is difficult. In the art, such manipulation has been achieved through the use of pointed objects and tools not specifically intended for that purpose. One particular example of a construction wherein removal of a C-ring has proved difficult is in connection with the air conditioning compressor assembly wherein a C-ring is utilized to retain components within a compressor cavity.

The provision of a tool which will quickly and efficiently permit the removal and insertion of a retaining ring would expedite and facilitate servicing and assembly of devices such as air conditioning compressors.

SUMMARY OF THE INVENTION

Generally speaking, in accordance with the instant invention, a retaining ring remover tool is provided including a handle, a shaft secured at one end to the handle and an angled off-center pin mounted on the other end of said shaft and disposed in an orientation allowing its insertion into one of the holes in an installed retaining ring. The pin of the ring remover tool is adapted for insertion into one of the holes in a retaining ring of the C-ring type. When the tool is rotated, the retaining ring is caused to move partially out of its groove. An upward pull on the remover tool will cause the retaining ring to "pop" completely or at least partially out of its groove. The shaft may be formed with a circumferentially extending groove adjacent the region of said pin. Once the retaining ring is partially out of its groove, the groove in the shaft of the tool may be engaged with the edge of the retaining ring. An upward pull on the remover tool will then cause the retaining ring to "pop" completely out of its groove.

The tool is particularly adapted to permit insertion and removal of retaining rings in air conditioning compressors.

Accordingly, it is an object of the instant invention to provide a tool capable of removing air conditioning compressor retaining rings from their grooves in compressor housings.

Another object of the instant invention is to provide a tool capable of inserting air conditioning compresssor retaining rings into their grooves in compressor housings.

Still another object of the invention is to provide a tool capable of inserting and removing C-shaped retainer rings.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of the tool in accordance with the invention about to be inserted into a compressor housing with portions of the housing broken away.

FIG. 2 is an enlarged sectional view taken along line 2—2 of FIG. 1 showing the pin of the tool inserted into a hole in the retaining or C-ring.

FIG. 3 is a sectional view taken along line 3—3 of FIG. 2 showing the end of the tool.

FIG. 4 is a sectional view, similar to FIG. 2, but showing the effect of a 180° turn of the tool on the C-ring.

FIG. 5 is a perspective view similar to FIG. 1 with the tool inserted into a hole in the C-ring where the C-ring is partially out of its groove.

FIG. 6 is a perspective view of the compressor housing similar to FIG. 1 with the tool's groove locked into the edge of the C-ring for complete withdrawal.

FIG. 7 is an enlarged sectional view, taken along the line 7—7 of FIG. 6 showing the manner in which the tool's groove locks onto the edge of the C-ring.

FIG. 8 is a sectional view, taken along line 8—8 of FIG. 7 showing the tool's groove locked onto the edge of the C-ring so that it may be removed by an upward thrust.

FIG. 9 is a perspective view of the tool being used to install a C-ring into a compressor housing.

FIG. 10 is an enlarged sectional view taken along line 10—10 of FIG. 9 showing the tool inserted into a hole in a C-ring being installed.

DETAILED DESCRIPTION OF THE PREFERRED EMBODIMENT

Reference is first made to FIG. 1, wherein a C-ring remover tool 10, inserted in a compressor housing 32, in accordance with the instant invention is depicted. The compressor housing depicted is a Model R4 or A6 automobile air conditioning compressor manufactured by General Motors Corporation. The tool as actually inserted is shown in FIGS. 2–5. Compressor housing 32 is formed with a compressor cavity 34 having at the base thereof a retainer ring 26 in the form of a C-ring. The C-ring is captured in a circumferential groove 36 in the inner wall defining cavity 34. C-ring 26 is formed with a hole 28 in each enlarged end positioned so as to be exposed when the C-ring is captured in groove 36. The tool, generally indicated as 10, is composed of a shaft 12, and a handle 14 suitable for providing a turning force, attached to a first end of shaft 10. A differentiated head 16 composed of a groove 18, biplanar end 20 and pin 24 is formed at a second end of shaft 10. Pin 24 of the tool 10 is dimensioned to be inserted in C-ring hole 28 of the C-ring 26.

The biplanar end 20 of shaft 12 has an inclined portion 38 extending at an angle to the axis of shaft 12 and a second portion 40 extending essentially normally to said axis. Pin 24 may be formed from a separate member secured in a bore formed in head 16 in the region of inclined portion 38 of end 20. In particular, the pin is positioned so as to be inclined toward the periphery of shaft 12 and is further positioned spaced from the axis of the shaft so that the outer end of pin 24 is essentially adjacent to the plane defined by the periphery of said shaft. (FIG. 2). The differentiated head 16 is further formed with two flattened regions 42 on opposite sides thereof extending from end 20 to circumferential groove 18.

Referring next to FIGS. 2 and 3, the orientation of shaft 12, pin 24, C-ring 26, C-ring hole 28 and compressor housing groove 30 when the tool has been inserted into the C-ring hole 28 of an installed C-ring is shown. When the tool is inserted within the cavity, the end of pin 24 is positioned for registration with hole 28 and the shaft may abut the inner wall of the compressor housing 32 defining cavity 34.

Referring next to FIGS. 4 and 5, the effect of an approximately 180° turn of the shaft 12 is shown. The turn causes the pin 24, which is inserted into C-ring hole 28, to force an end of the C-ring 26 from compressor housing groove 36. The abutting of shaft 12 against the inner wall of housing 32 permits the easy displacement of one end of the C-ring from the groove. Once freed from groove 36, the end of C-ring 26 may rise up onto the pin 24 and not slip back into the compressor housing groove 36. The C-ring 26 slides up the pin 24 in the direction of arrow 25 and twists slightly until it rests against the plane of the angled surface 38 of head 16, from which the pin 24 projects. If an upward force is now applied to tool 10 in the direction of arrow 27, the C-ring can usually be freed entirely from the groove 36 and removed. The shaft 12 of tool 10 should be maintained parallel to the cavity wall and a sharp pull applied to handle 14.

If the C-ring is not removed in this manner, groove 18 of tool 10 may be used. Referring next to FIGS. 6, 7 and 8, the groove 18 of the tool 10 is shown engaged against the edge of C-ring 26 so that a generally upward force on the tool 10 causes the entire C-ring 26 to free itself from compressor housing groove 30 and to permit removal of the retaining ring. Flattened regions 42 of head 16 permit insertion of the tool 10 for this purpose where clearance is small.

Reference is next made to FIGS. 9 and 10 in which the reinsertion of a C-ring 26 in a compressor housing groove 36 is depicted in accordance with the instant invention. First, one end of C-ring 26 is placed into compressor housing cavity 34. Next, pin 24 of tool 10 is inserted into the C-ring hole 28 on the other end of the C-ring 26 and pressure downward and toward the center of the compressor housing cavity 34 is applied until the C-ring 26 is positioned completely inside the compressor housing cavity. Then, either using tool 10 or another device, the ring may be seated in groove 36.

While depicted in connection with a General Motors automobile air conditioning compressor, the tool in accordance with the invention may be used to remove or insert other C-shaped retainer rings.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tool for removing a C-ring formed with a hole in at least one end thereof, comprising a shaft, handle means attached to said shaft for aiding in the displacement thereof and a pin dimensioned for receipt within said C-ring hole and projecting from an end of said shaft from a position spaced from the axis of said shaft, said pin being angled relative to said axis, whereby said pin is adapted to engage said C-ring hole for removal of the C-ring, said shaft being formed with a groove extending about the circumference of the shaft in the surface thereof extending in a plane which extends substantially normally to the axis of said shaft, said groove being positioned in a region adjacent to the end of said shaft supporting said pin, whereby said groove is adapted to engage the inner edge of said C-ring as a secondary removal means following the use of said pin.

2. A tool as claimed in claim 1, wherein said pin is angled toward the periphery of said shaft.

3. A tool as claimed in claim 2, wherein said shaft is provided with an essentially straight surface extending along the length thereof.

4. A tool as claimed in claim 3, wherein said end of said shaft is formed with an angled surface, said pin projecting from said angled surface.

5. A tool as claimed in claim 1, wherein said shaft is a cylindrical shaft.

6. A tool as claimed in claim 1, wherein said handle means is attached to the end of said shaft spaced from said pin.

7. A tool as claimed in claim 1, wherein a portion of the region of the shaft between the groove and the end thereof is formed with a flattened periphery.

8. A tool as claimed in claim 1, wherein said shaft is used for removing and inserting C-rings in air conditioner compressor housings.

* * * * *